Nov. 10, 1931.     H. G. SPILSBURY     1,831,082

PAIL CLAMP

Filed Aug. 6, 1927

Inventor
Hugh G. Spilsbury
By his Attorney
Albert M. Austin

Patented Nov. 10, 1931

1,831,082

UNITED STATES PATENT OFFICE

HUGH G. SPILSBURY, OF CRANFORD, NEW JERSEY, ASSIGNOR, BY MESNE ASSIGNMENTS, TO FRANCIS EARLE, OF MONTCLAIR, NEW JERSEY

RAIL CLAMP

Application filed August 6, 1927. Serial No. 211,214.

This invention relates to clamping devices, and more particularly to rail clamps which are employed for applying end pressure to a pair of rails during butt welding by the aluminothermic process.

In order to apply end pressure to a pair of rails it is necessary to affix clamps to the adjacent rails near the ends thereof, and after the clamps have been pressed into firm engagement therewith to apply longitudinal pressure for the purpose of drawing the rail ends firmly together. This process involves two steps, namely, applying the clamps to the rails and subjecting the clamps to longitudinal pressure. Clamps are preferably applied to the web of the rail since there is only three eighths of an inch variation in the thickness of webs of the commercial sizes of rails whereas the heads vary greatly in thickness. Consequently, in removing such clamps it is necessary to release the same to a sufficient extent to allow them to clear the rail head. This involves a considerable amount of time and labor, especially when rails are being welded which have a head portion extending a considerable distance beyond the web.

This invention provides a rail clamp which may be readily applied to the web of a rail and readily removed therefrom by a simple operation. The clamp is further provided with means for causing the same to firmly grip the rail web and to apply longitudinal pressure to the rails in a single operation. The clamp also involves a support for an aluminothermic reaction pot, and thereby eliminates the necessity for applying a support thereto after the clamp has been positioned.

The invention also consists in certain new and original features of construction and combinations of parts hereinafter set forth and claimed.

Figure 1:
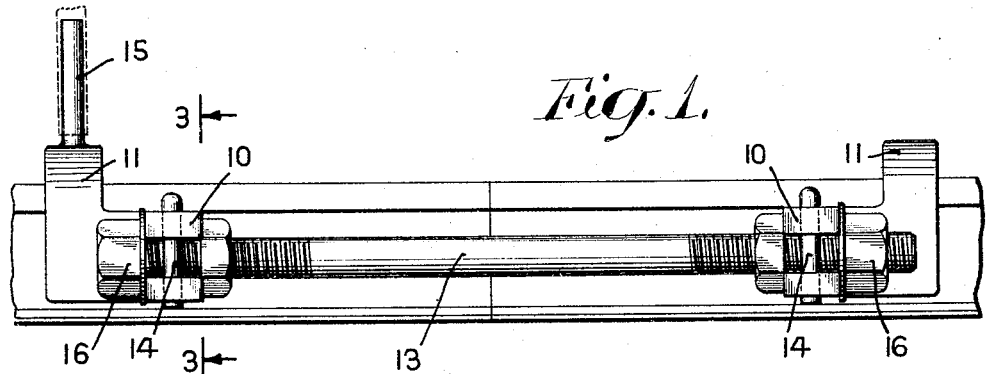
Figure 2:
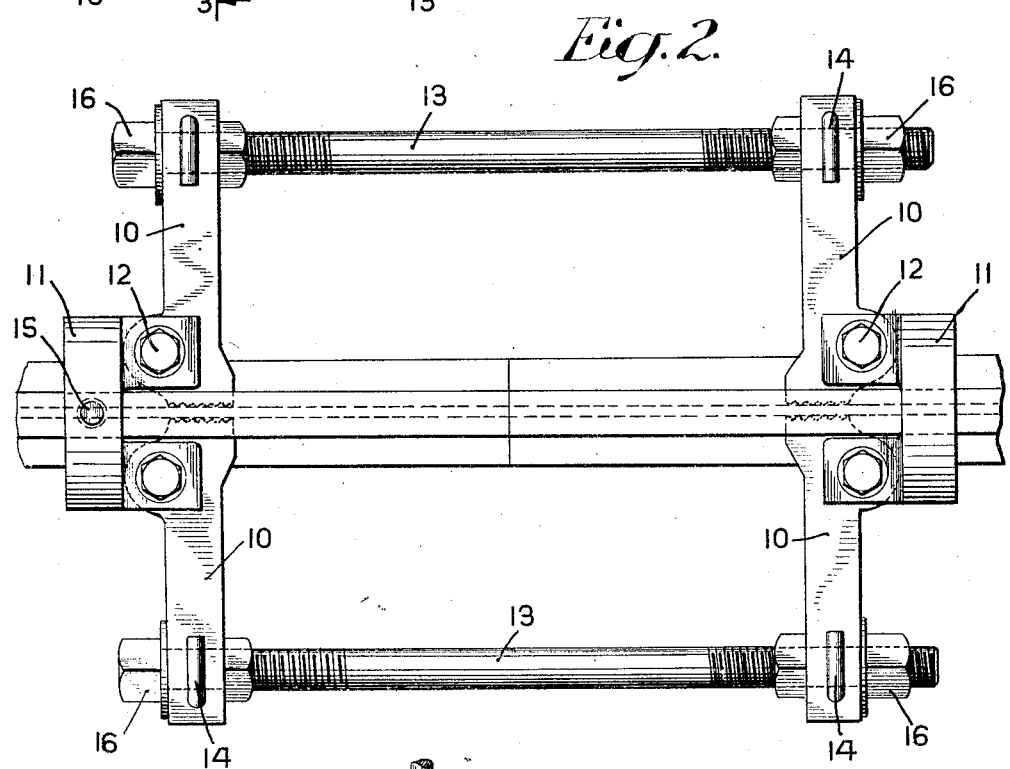
Figure 3:
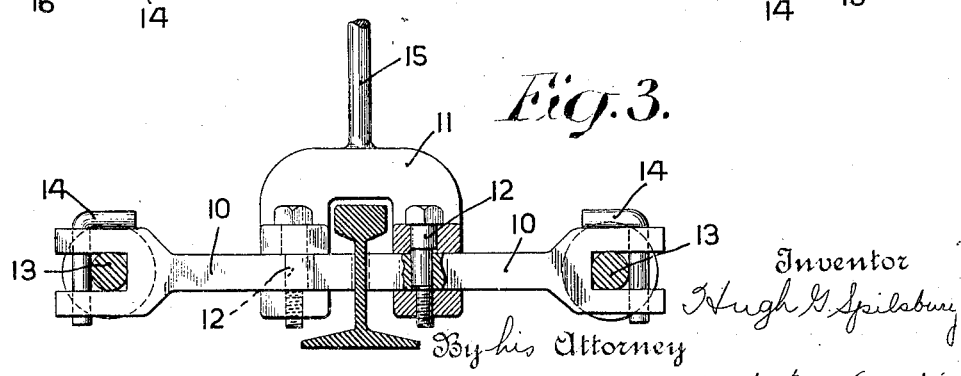

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is an elevation of a rail clamp constructed in accordance with this invention;
Fig. 2 is a plan view thereof; and
Fig. 3 is a section taken on the line 3—3 of Fig. 1.

Like reference characters denote like parts in the several figures of the drawings.

In the following description and in the claims parts will be identified by specific names for convenience, but they are intended to be as generic in their application to similar parts as the art will permit.

Referring to the drawings more in detail, the particular embodiment of this invention which has been shown for purposes of illustration comprises a pair of arms 10 pivoted to yoke 11 by means of eccentric pins 12, which are provided with serrated ends for bearing against the web of a rail and securing a firm grip thereon. The serrations are preferably located entirely off centre with respect to pins 12 to permit said arms 10 to fold back about said pins when pressure is released as will be hereinafter set forth. Yoke 11 is adapted to overlie the rail head and to provide pivot points on both sides thereof at which said arms 10 may be supported. Yoke 11 is preferably U-shaped, and the two ends thereof extend at right angles to the U-shaped portion a sufficient distance to provide a bearing surface for pins 12.

Arms 10 are suitably drilled to receive said pins 12, the pivot points produced thereby being located at a suitable distance from the center line of the arms to permit of the clamping action hereinafter set forth.

The ends of arms 10 opposite the serrated portion are bifurcated and adapted to receive clamping rods 13. Said rods 13 are threaded at the two ends and provided with suitable clamping nuts 16 by means of which pressure is applied to the bifurcated ends of arms 10 in a direction perpendicular thereto and parallel to the clamped rail. The bifurcated portions of arms 10 are further provided with pins 14 which are inserted after rod 13 has been positioned, and serve to lock said rod in position. Pins 14 may, however, be readily removed for the purpose of allowing rods 13 to be withdrawn when the clamp is to be removed from the rail.

One of said yokes 11 may be provided with an upstanding rod 15 formed as an integral part thereof for the purpose of supporting the aluminothermic reaction pot. Said rod is preferably formed of such size that it may be inserted in the tubular support which is commonly employed on reaction pots in the aluminothermic process.

Pins 12 are formed with eccentric surfaces by means of which the distance between the pivot points of arms 10 and the rail web may be adjusted as desired. Since the clamps may be employed with rails having webs of different thicknesses, this adjustment may be designed to allow the device to operate most efficiently when applied to a given size rail.

In applying the above described clamp to a rail web, pins 14 are removed from the bifurcated ends of arms 10, and said arms folded back about pivot points 12 to provide clearance for passage over the rail head. Arms 10 are then moved to an outstanding postion whereby the serrated portions thereof come in firm contact with the rail web, rods 13 inserted in the bifurbated ends and located therein by pins 14. Longitudinal pressure may then be applied to said rails by tightening nuts 16 on said rods 13 whereby arms 10 are caused to rotate about pivot points 12 and to hold the rail web in a vise-like grip. By further tightening said nuts 16, the clamps and the rails which are gripped thereby are drawn in a longitudinal direction whereby the adjoining rail ends are pressed firmly together. The amount of pressure applied may be suitably regulated as required in the aluminothermic butt welding process. In applying the above described clamps, eccentric pins 12 should be adjusted so that the entire serrated edge of arms 10 makes a firm contact with the rail web, and so that the arms extend substantially normal to the rail when pressure is being applied thereto.

After the clamps have been applied as above described, the tubular support for the aluminothermic reaction pot may be passed over upstanding pin 15 and supported thereby. Yoke 11 therefore serves not only to provide the required pivot points for arms 10 but also to hold the welding pot in a desired position whereby the necessity for the use of a separate clamp is eliminated.

After the welding operation has been completed, the clamp may be removed from the rail by slightly loosening nuts 16, withdrawing pin 14 and removing rod 13 from the bifurcated ends of arms 10. Said arms may then be folded back to permit the serrated ends thereof to clear the rail head. The yoke and arms may then be lifted as a unit over said rail head and removed from the rail.

It is evident, therefore, that a single operation is required in applying or removing a clamp, and a single adjustment is utilized for causing the clamp to grip the rail web and to apply a longitudinal stress thereto. The clamp may be adjusted to any desired size rail by adjusting the pin in accordance with the thickness of the rail web. In the preferred construction, sufficient clearance would be obtained in folding the arms back upon the supporting yokes to permit the clamp to pass over any standard size rail head. Consequently no adjustment would be required to take care of variations in this portion of the rail.

In the drawings accompanying and forming part of this specification, a practical commerical embodiment of the invention is disclosed, but as such illustration is primarily for purposes of disclosure, it will be understood that the structure may be modified in various respects without departure from the broad spirit and scope of the invention as hereinafter defined and claimed.

What is claimed is:

1. A rail clamp comprising a yoke adapted to pass over a rail head, a pair of arms having ends adapted to grip the sides of a rail, said arms being pivoted to said yoke on opposite sides of the rail about an axis offset transversely of said arms with respect to the gripping surfaces thereof, whereby rotary movement of said arm about said pivot in one direction brings said surfaces into engagement with the rail and rotary movement in the other direction releases said rail and provides clearance for moving said clamp over the rail head.

2. A rail clamp comprising a yoke adapted to pass over a rail head, a pair of arms having ends adapted to grip the sides of a rail, said arms being pivoted to said yoke on opposite sides of the rail about an axis offset transversely of said arms with respect to the gripping surfaces thereof, whereby rotary movement of said arm about said pivot in one direction brings said surfaces into engagement with the rail and rotary movement in the other direction releases said rail and provides clearance for removing said clamp over the rail head, and means for applying transverse pressure to the free ends of said arms whereby a rail is tightly clamped and longitudinal pressure is applied thereto.

3. A rail clamp, a yoke adapted to pass over a rail head and carrying a pair of arms on opposite sides thereof, said arms being pivoted to said yoke and adapted to be brought into clamping engagement with said rail upon movement in one direction and to be folded back away from said rail to provide clearance for removal over the rail head upon movement in the other direction.

4. A rail clamp comprising a pair of yokes adapted to go over a rail head, arms pivoted to said yokes on opposite sides of the rail and having gripping surfaces adapted to be brought into gripping contact with said rail upon rotational movement of said arms, a pair of tensioning members joining said arms and adapted to apply transverse pressure to the ends thereof in a direction for causing said gripping surfaces to engage the rail and to apply longitudinal pressure to the rail for welding purposes.

5. A rail clamp comprising a U-shaped yoke adapted to pass over a rail head and having extensions on opposite sides of the rail, arms pivoted in said extensions and having gripping surfaces offset with respect to the pivot point whereby rotational movement of said arms brings said surfaces into engagement with said rail.

In testimony whereof I have hereunto set my hand.

HUGH G. SPILSBURY.